United States Patent [19]

Min

[11] 4,392,098
[45] Jul. 5, 1983

[54] RPM SENSOR FOR ELECTRONIC MOTOR BRAKING

[75] Inventor: Young K. Min, Milwaukee, Wis.

[73] Assignee: PT Components, Inc., Indianapolis, Ind.

[21] Appl. No.: 311,842

[22] Filed: Oct. 16, 1981

[51] Int. Cl.³ .............................................. H02P 3/24
[52] U.S. Cl. .................................. 318/758; 318/759; 318/371
[58] Field of Search ............... 318/370, 371, 372, 757, 318/758, 759, 760, 761, 762, 449, 459, 453, 474, 368, 369

[56] References Cited

U.S. PATENT DOCUMENTS

| | | | |
|---|---|---|---|
| 3,277,357 | 10/1966 | Willis | 318/372 |
| 3,439,245 | 4/1969 | Perdue | 318/459 |
| 3,665,272 | 5/1972 | Spiess | 318/758 |
| 3,761,790 | 9/1973 | Daab | 318/372 |
| 4,207,508 | 6/1980 | Habisohn | 318/779 |
| 4,225,813 | 9/1980 | Sahasrabudhe | 318/371 |
| 4,305,030 | 12/1981 | Lorenz | 318/759 |
| 4,340,131 | 7/1982 | Eriksson | 318/371 |
| 4,674,176 | 2/1978 | Parke et al. | 318/370 |

Primary Examiner—David Smith, Jr.
Attorney, Agent, or Firm—Robert A. Brown

[57] ABSTRACT

The motor braking circuit for use with an alternating current motor and an AC power source includes a power circuit for supplying a DC braking current to the AC motor and a motor speed sensor which causes a mechanical brake to engage the AC motor and its load when the motor speed decreases to a predetermined value. The DC braking current is applied to start the electrical braking cycle as soon as the AC source is disconnected from the AC motor. The RPM sensor monitors the speed of the AC motor during the electronic braking cycle and causes the mechanical brake to engage the motor and its load when the motor speed decreases to a predetermined value to complete the stopping sequence. The AC motor braking system can be installed without any additional direct wiring or additional hardware to the AC motor.

9 Claims, 1 Drawing Figure

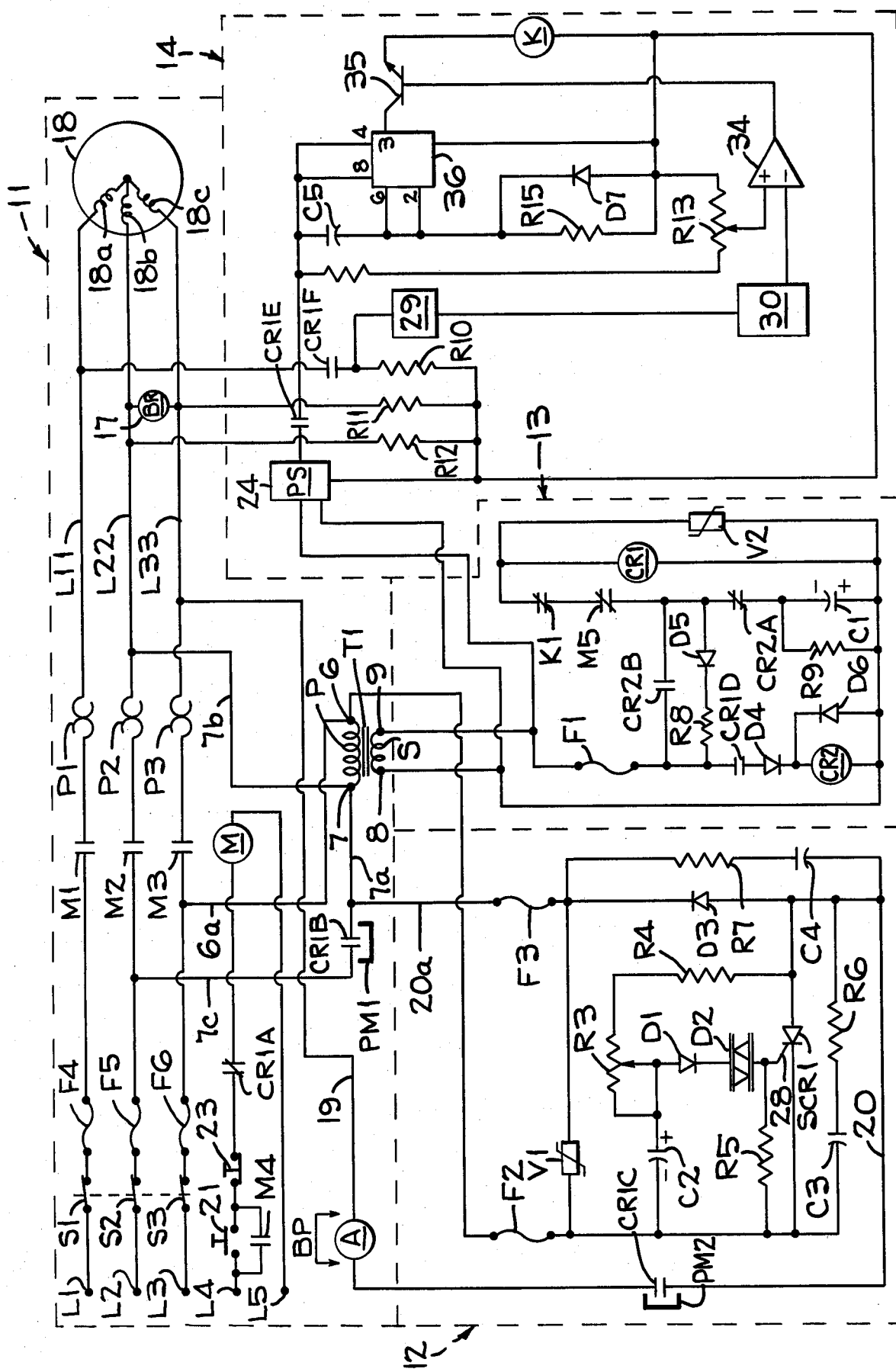

RPM SENSOR FOR ELECTRONIC MOTOR BRAKING

BACKGROUND OF THE INVENTION

1. Field of the Invention

This invention relates to electronic motor braking systems, and more particularly, to an electronic braking system having means for sensing that motor speed has decreased to a predetermined value.

2. Description of the Prior Art

Electronic or dynamic braking for slowing down and stopping electrical AC motors is well known in the motor art. It offers the advantage of being smooth and is not subject to the severe problems of rubbing surfaces used in mechanical braking systems. Dynamic braking employs a principal of removing an alternating current from the motor and applying an amplitude and time controlled DC current to the stator windings of the AC motor. The DC current produces a static field across the stator winding which generates a counterforce in the rotor of the AC motor to rapidly decelerate the motor without any mechanical braking. Preferably this dynamic braking is achieved without any modification to the AC motor or parallel connected AC motor brake solenoid. A mechanical brake can be employed to hold the motor in a stopped position and may also be used to help bring the motor to a complete stop.

Some of the prior art dynamic braking circuits employ a timing circuit which is connected between two of the AC power lines which are connected to the AC motor. A electro-mechanical brake release coil (AC solenoid) is connected across the same AC lines which supply power to the AC motor and when energized, the brake solenoid holds a spring loaded mechanical brake mounted on the motor in its released position. As long as power is uninterruptedly connected to the aforesaid motor lines, the brake release coil disengages the mechanical brake from the AC motor. After the timer has completed its timing sequence, the release coil is deenergized and the mechanical brake is engaged by the brake spring.

This timing circuit works well in conjunction with the electronic braking circuit to bring the motor to a low speed quickly. Unfortunately, varying load conditions, which are encountered in many motor applications make it more difficult to estimate the time required to reduce motor speed to a value at which the mechanical brake can engage the motor without causing excessive mechanical brake wear. What is needed is a device for sensing the decreasing speed or RPM of the AC motor and for causing the mechanical brake to engage the motor when the motor speed has decreased to a predetermined value.

SUMMARY OF THE INVENTION

The present invention comprises an RPM sensor for use with an electronic motor braking circuit. The electronic braking circuit provides DC braking current to the AC motor which causes the motor speed to decrease and prevents a friction brake release coil from becoming deenergized which would cause a mechanical brake to set. The RPM sensor of the present invention can be connected to an existing three-phase AC motor system and requires no change or additional wiring for the motor or to its electromechanical brake between the motor control cabinet up to and including the motor. When the RPM sensing system of the present invention is connected into an existing electronic braking circuit, the only change in the circuit that is required is the addition of a single relay contact in the DC braking control circuit.

The RPM sensor is connected to the three-phase motor input leads by a relay contact which closes when the AC motor is disconnected from its AC power source. The rotating motor rotor generates an AC voltage whose frequency is proportional to the rotating speed of the motor. The voltage generated by the electronically braked motor is applied to a filter which removes any sixty hertz line voltage which may be present in the system and the output of the filter is coupled to a frequency-to-voltage converter. This converter produces a voltage proportional to the rotating speed of the motor being braked. The converter output prevents the electro-mechanical brake from engaging the motor until after the voltage decreases to a predetermined value corresponding to a predetermined motor speed. When the voltage reaches this predetermined value a relay is energized and the electro-mechanical brake engages the motor to quickly stop the motor shaft and prevent it from rotating.

BRIEF DESCRIPTION OF THE DRAWING

The FIGURE of the drawing is a schematic diagram of an RPM sensor for use with a three-phase AC motor circuit.

DESCRIPTION OF THE PREFERRED EMBODIMENT

An RPM sensor of the present invention comprises an AC motor circuit 11, a DC power circuit 12, a control circuit 13, an RPM sensing circuit 14 and an electromagnetic brake coil 17 for a mechanical brake (not shown). The motor circuit 11 includes a three-phase induction motor 18 having a plurality of stator windings 18a–18c connected to a source of three-phase AC power by a plurality of overloaded protectors P1–P3, contacts M1–M3, and disconnects S1–S3. The switches S1–S3 are normally left closed during the operation of the system and the motor is turned on and off by the usual relay start-stop circuit which connects the contacts M1–M3 to a power source such as three-phase 460 volts, connected to a plurality of terminals L1–L3. The start-stop circuit includes a push-button start switch 21, a push-button stop switch 23 and a normally closed contact CR1A to control the power to a contactor M. The contactor M controls a plurality of normally opened contacts M1–M4 and a normally closed contact M5. In the drawing the contacts are shown in the addition present when the contactor M is deenergized.

When the start button 21 is depressed AC power from a pair of terminals L4, L5 is coupled through the start-stop switches 21, 23 and the normally closed contact CR1A to energize the contactor M which closes the motor contacts M1–M4 and opens the control circuit contact M5. The closed contacts M1–M3 apply three-phase AC voltage from input terminals L1–L3 to energize the motor 18 through motor lines L11, L22, and L33 and the closed holding contact M4 bypasses the start switch 21 to keep the contactor M energized after the start button 21 is released. The normally closed contact M5 in the control circuit 13 is opened when the motor is running and is only closed when the contactor M is deenergized by the motor stop switch 23. The electromechanical brake is widely used for stopping rotation of electric motors and details of the brake are not disclosed in the application as they are not considered part of the invention. The motor brake (not shown) is urged to its braking position by a spring on the brake when the brake coil 17 is deenergized. The brake is held in its release condition against the force of the spring when the coil 17 is energized from the motor lines L22, L33.

Terminal 6 of the primary winding P of the transformer T1 is always connected to the source line from terminal L3 by a line 6a. Terminal 7 of the primary winding is energized by the line 7b and the motor line L22 when the motor is running and by line 7a, a contact CR1B that bridges contactor M2, a line 7c and the source line from terminal L2 when the motor contacts M1–M3 are opened. The secondary winding S of the transformer T1 supplies AC to the control circuit 13.

The DC power circuit 12 received AC power from one-phase of the three-phase AC source on terminals L2, L3 and converts it into a DC braking current for dynamic braking of the motor 18. The power circuit also includes a current circulating loop for employing current generated by the magnetic field in the stator as a DC braking current. Details of the power circuit 12 and the control circuit 13 are disclosed in a copending patent application Ser. No. 159,326, filed June 13, 1980 by Dennis Lorenz and assigned to the assignee of the present invention. The power circuit 12 includes a braking current amplitude control in the form of a potentiometer R3 to adjust the amount of DC braking current received by the motor 18 during the dynamic braking period and thus, adjusts the rate of deceleration of the motor. A thyristor SCR1 conducts on alternate halves of each AC cycle (when contact CR1C is closed) to convert the AC power into pulsating DC current, and a firing circuit which includes variable resistor R3 and resistors R4, R5, and capacitor C2, diode D1 and diac D2 all of which determine the number of degrees of the AC cycle that SCR1 conducts and thus determines the total amount of DC current provided during each half cycle. The conduction time of SCR1 can be changed by adjusting the setting of the variable resistor R3 and thus controlling the amplitude of the triggering voltage on a gate 28 of SCR1. The value of the pulsating DC current through SCR1 can be observed by the ammeter A and the setting of potentiometer R3 adjusted to obtain the desired value. The ammeter A can then be removed from the circuit, if desired by providing a bypass lead BP across the ammeter. The diac D2 fires and provides a quick turn-on of the SCR1 when the voltage across capacitor C2 and across the diac D2 reaches the firing level of the diac. A resistor R6 and a capacitor C3 comprise a filter circuit which protects the SCR1 from large transient voltages which could damage the SCR.

Line 19, contact CR1C, line 20 and a "free-wheeling" diode D3 and lines 20a, 7a, and 7b provide a path for motor current generated by the collapse of the magnetic field in the motor stator when the motor is initially disconnected from the power source and provides a path for current during the alternating half cycles when SCR1 is not conducting. A resistor R7 and a capacitor C4 protect the diode D3 from transient voltages.

The control circuit 13 includes a contactor CR1 having the contact CR1B which connects the DC power circuit between the AC source and the motor 18 whenever an energizing current is applied to the relay CR1. A capacitor C1 provides an initial pulse of energizing current to the coil of the contactor CR1 as soon as the motor contactor M is deenergized. The secondary S of transformer T1 continues to provide this energizing current until the contact K1 is opened by the RPM sensing circuit 14. The result is a fast turn-on of the DC braking current with a large initial value of DC braking current to provide a rapid decrease in the motor speed, followed by a smaller value of DC braking current until a motor speed decreases to a predetermined low value. The RPM sensor 14 includes a DC power supply 24 connected to receive power from the secondary S of the transformer T1. The output of the DC power supply 24 supplies power for the RPM sensing circuit 14 through a contact CR1E whenever energizing current is applied to the relay CR1.

RPM sensing information is coupled from the AC motor lines L11–L33 by a plurality of resistors R10–R12 connected in a Y arrangement. Resistors R11 and R12 are connected to the lines L33, L22 respectively which are also connected to the electromechanical motor brake BR. The resistor R10 is connected to the motor line L11 by a contact CR1F. During the braking interval the frequency of the voltage developed across resistor R10 is directly proportional to motor RPM.

A notch filter 29, tuned to remove the high amplitude 60 hertz voltage present during the electronic braking interval, is connected to the resistor R10. The notch filter 29 removes the 60 hertz voltage component and passes the lower amplitude induced voltage from the stator 18a, to a frequency-to-voltage converter 30. The converter 30 produces a DC output voltage directly proportional to the frequency of the voltage from the rotating motor 18. This frequency is also directly proportional to the RPM of the motor 18. The DC voltage from the converter is compared with a standard voltage from a potentiometer R13 by a voltage comparator 34. When the voltage at the inverting input of the comparator is greater than the voltage on the non-inverting input, the output of the comparator is low thereby rendering transistor 35 nonconductive and keeping the relay K deenergized. When the voltage at the inverting input terminal of the comparator is less than the voltage on the non-inverting input, the output of the comparator 34 is high thereby rendering the transistor 35 conductive and energizing the relay K so that the contact K1 opens. A delay circuit 36 and its associated RC circuit C5, R15 delay the application of a voltage to the transistor 35 so that the transistor will not be rendered conductive when the AC voltage to the motor 18 is initially removed. The resistors R10–R12 are wired in a Y connection to obtain a neutral point having a voltage comparable to the junction point of the stator windings 18a–18c of the motor and eliminate the necessity for opening the motor and wiring an internal connection within the motor. One delay circuit 36 which can be used is the 555 which is available from several manufacturers. A diode D7 provides a means for discharging the capacitor C5 once the transistor 35 and the delay circuit 36 have been rendered conductive.

To start the motor 18, the switches S1–S3 are closed to connect the contacts M1–M3 to the three-phase power source at terminals L1–L3. When the starter button 21 is depressed the AC voltage from the terminals L4 and L5 energizes the coil of the contactor M to close the contacts M1–M4 and open the contact M5. The closed contacts M1–M3 provide running current to the motor 18 and the contact M2 connects the primary P of the transformer T1 between terminal L3 and power line L22 to energize the transformer. A voltage across the transformer secondary winding S causes a current to flow from terminal 8 of the secondary winding to the lower plate of the capacitor C1, from the upper plate of C1 through the normally closed contact CR2A, diode D5 and resistor R8 to transformer terminal 9 to charge the capacitor C1 to the polarity shown. The capacitor C1 remains charged during the time the motor 18 is energized.

When the stop button 23 is depressed, the contacts M1–M5 return to the deenergized position shown in the drawing and power is removed from the motor due to the opening of contacts M1–M3. Contact M5 closes causing an initial pulse of energizing current to flow from the lower plate of capacitor C1 through the coil of the contactor CR1, through contacts K1, M5 and CR2A to the upper plate of C1. The current pulse causes the contacts of contactor CR1 to quickly switch positions with the CR1A contact opening and contacts CR1B–CR1F closing. Opening the contact CR1A insures that the coil of contactor M remains deenergized during the dynamic braking period. Closing the contact CR1C connects the diode D3 in parallel with the braking coil 17 to provide a low resistance path between lines L22 and L33 when the contacts M1–M3 are opened. When the contacts M1–M3 open, the rotating motor 18 generates an EMF (voltage) between the lines L22 and L33 causing a relatively large DC current to flow through the stator winding 18b, 18c of the motor, from the line L33, through the ammeter A, the now closed contact CR1C, diode D3 and fuse F3 to the line L22. The large DC current through the motor stator windings provides a strong magnetic field which reacts with the revolving motor rotor to provide a powerful braking force on the motor and rapidly decreases the rotor speed. The frequency of the EMF generated between the lines L22 and L33 is determined by the rotor speed of the motor.

The closed contact CR1B is in parallel with the contact M2 and provides voltage to the primary winding P of the transformer T1 from the power terminals L3 and L2. When the contacts CR1B, CR1D reach a stable closed equilibrium state the energized secondary winding S is connected across a diode D4 and the relay coil CR2 by the closed contact CR1D thereby providing pulses of current for energizing the relay CR2 to open the contact CR2A and close the contact CR2B. A diode D6 serves to smooth the current through the coil of the relay CR2. Opening the contact CR2A disconnects the upper plate of the capacitor C1 from the upper end of the relay CR1, but closing the contact CR2B causes a current to flow from terminal 8 of the transformer secondary through the coil of contactor CR1, through contacts K1, M5 and CR2B to terminal 9 of the transformer secondary winding to keep the contactor CR1 energized until the relay contact K1 is opened by the RPM sensor 14. The timer at which the relay contact K1 opens is determined by the rotor speed of motor 18.

When the EMF of the motor 18 decreases sufficiently the SCR is rendered conductive and a dynamic braking current flows from the power terminal L2 through contact CR1B, to line L22, through the motor to line L33, through contact CR1C and the thyristor SCR1 to terminal L3 on alternate half cycles of the voltage between terminals L2 and L3 as long as the contactor CR1 is energized. The total amount of braking current through the motor and through SCR1 is determined by the setting of variable resistor R3 as discussed hereinbefore. During the half cycle when SCR1 is nonconductive, the motor stored magnetic energy provides a braking current which flows from line L33 through contact CR1C and diode D3 to line L22. The braking current reacts with the rotating motor rotor to provide a strong braking force to decrease the motor speed. The decreased motor speed reduces the frequency of the voltage generated in the stator winding 18a and reduces the output voltage of the frequency-to-voltage converter 30. When the output voltage of converter 30 decreases to a value below the reference voltage from potentiometer R13, the comparator 34 provides an output voltage which causes transistor 35 to conduct and energizes the relay K. The energized relay K opens contact K1 and terminates the current through the contactor CR1 so that the contactor CR1 deenergizes and the contactor contacts CR1B–CR1F open. The open contact CR1B deenergizes transformer T1 and the open contact CR1C terminates the braking current allowing the electromechanical brake to engage the motor 18. A resistor R9 across the capacitor C1 provides a discharge path and prevents a potentially dangerous voltage from remaining across the terminals of this storage capacitor.

A plurality of fuses F1–F6 provide overcurrent protection for various portions of the circuits. A pair of varistors V1 and V2 limit the transient voltage across portions of the circuit to prevent damage to the circuit elements. A pair of permanent magnet blowouts PM1, PM2 reduce arcing when the contacts CR1B, CR1C are opened.

The RPM sensor of the present invention can be used with a variety of motor sizes and the speed at which the electromechanical brake engages the motor can be varied over a wide range by the user by adjusting the setting of the potentiometer R13.

Although the best mode contemplated for carrying out the present invention has been herein shown and described, it will be apparent that modification and variation may be made without departing from what is regarded to be the subject matter of the invention.

What is claimed is:

1. An RPM sensor for use with an AC induction motor having an electronic braking circuit and an electromechanical brake, said sensor causing said brake to engage said motor when the motor speed decreases to a predetermined value, said sensor comprising:
   an electronic filter;
   means for connecting said filter to a stator of said motor to obtain an electrical signal having a frequency proportional to the speed of said motor;
   a frequency-to-voltage converter connected to said filter for developing an output voltage determined by said motor speed; and
   means for using said converter output voltage to cause said brake to engage said motor when said output voltage reaches a predetermined value corresponding to a predetermined motor speed.

2. An RPM sensor as defined in claim 1 including a voltage comparator having first and second inputs and an output, said comparator developing an output voltage having a value determined by the values of signals applied to said first and said second inputs, means for connecting said first input to said converter, a reference voltage connected to said second comparator input, and means for connecting said comparator output to said brake engaging means to control the operation of said brake.

3. An RPM sensor as defined in claim 2 including a relay connected to said brake for controlling the operation of said brake in response to a signal from said comparator, and means for connecting said relay to said output of said comparator.

4. An RPM sensor as defined in claim 1 including means for coupling a DC braking current from said braking circuit to said stator windings when AC power is removed from said stator windings, and means for terminating said DC braking current when the motor speed decreases below said predetermined value.

5. An RPM sensor for use with an AC induction motor having a plurality of stator windings with an associated electro-mechanical motor brake and an associated electronic braking circuit, said sensor causing said brake to engage said motor when the motor speed decreases below a predetermined value, said sensor comprising:
 an electronic filter;
 means for coupling said filter to one of said stator windings of said motor;
 a frequency to voltage converter connected to said filter to cause said converter to produce an output voltage having a value determined by the speed of rotation of said motor;
 a voltage comparator having first and second inputs and an output, said comparator developing an output voltage having a value determined by the values of signals applied to said first and said second inputs;
 means for connecting said first input of said comparator to said converter;
 a reference voltage connected to said second input of said comparator;
 a relay connected to said brake for controlling the operation of said brake in response to a signal from said comparator; and
 means for connecting said relay to said output of said comparator.

6. An RPM sensor as defined in claim 5 wherein said electronic filter rejects electrical signals having the same frequency as a power source used to operate said motor.

7. An RPM sensor as defined in claim 5 including a plurality of resistors connected in a Y circuit, means for connecting said resistors to said stator windings to obtain a neutral junction without connecting said resistors to the internal wiring of said motor, and means for connecting one of said resistors to said filter to obtain the voltage across one of said stator windings.

8. An RPM sensor as defined in claim 5 including means for selecting a value of said reference voltage to thereby select a motor speed at which said motor brake engages said motor.

9. An RPM sensor as defined in claim 5 including means for coupling a DC braking current from said braking circuit to said stator windings when AC power is removed from said stator windings, and means for terminating said DC braking current when the motor speed decreases below said predetermined value.

* * * * *